April 4, 1961 N. F. LOCKHART 2,978,176

MULTIPATH LOGICAL CORE CIRCUITS

Filed Sept. 20, 1957 4 Sheets-Sheet 1

*INVENTOR.*
NEWTON F. LOCKHART

*BY*

ATTORNEY

April 4, 1961 N. F. LOCKHART 2,978,176

MULTIPATH LOGICAL CORE CIRCUITS

Filed Sept. 20, 1957 4 Sheets-Sheet 2

April 4, 1961 N. F. LOCKHART 2,978,176

MULTIPATH LOGICAL CORE CIRCUITS

Filed Sept. 20, 1957 4 Sheets-Sheet 3

United States Patent Office 2,978,176
Patented Apr. 4, 1961

2,978,176

MULTIPATH LOGICAL CORE CIRCUITS

Newton F. Lockhart, Wappingers Falls, N.Y., assignor to International Business Machines Corporation, New York, N.Y., a corporation of New York Filed Sept. 20, 1957, Ser. No. 685,128

32 Claims. (Cl. 235—176)

The present invention relates to magnetic core circuits and, more particularly, to multipath core logical circuits.

Multipath magnetic core structures, that is, core structures which are divided by openings pierced through the magnetic material into a plurality of magnetic paths, have been utilized in a variety of circuit applications. Examples of such circuitry employing multipath cores are found in the copending application Serial No. 546,180, filed November 10, 1955, now Patent No. 2,869,112, in behalf of Lloyd P. Hunter and in the copending applications Serial No. 608,227 and Serial No. 613,952, filed, respectively, on August 30, 1956, and December 4, 1956, in behalf of Edwin Bauer. The multipath magnetic core structure is advantageous in that core structures of this type, which are divided into a plurality of flux paths linked selectively by input and output windings, actually provide a plurality of individual magnetic circuits which individually and in combination may be utilized to perform a large number of separate and/or related circuit functions. In the above-cited copending applications, the circuitry shown is, in the main, directed to circuitry requiring core outputs to be developed indicative of logical combinations of two inputs, or of a single input which may be quantified by different amounts. The subject invention is directed toward magnetic multi core structures which can be employed to produce logical outputs indicative of various combinations of any number of inputs.

Therefore, a prime object of the present invention is to provide improved multipath magnetic core circuitry.

A further object is to produce a universal logical circuit element.

A further object is to provide a magnetic core circuit element capable of producing outputs indicative of both commutative and non-commutative logical operators for a plurality of input variables.

In the description of the invention herein given by way of disclosure, the principles of the invention are illustrated in a binary full adder circuit which utilizes a single multipath core to perform all of the necessary logical switching. The core structure employed is a six-legged structure with openings in the core dividing each end thereof into three parallel legs. The cross sectional area of the top and bottom sections of the core is essentially equal to three times the cross sectional area of each of the individual legs. Initially, therefore, the core may be considered to comprise three parallel flux paths of unequal length, and, therefore, unequal reluctance, with each path including one of the legs at each end of the core. The three inputs are applied by means of three input windings, each of which is wound to embrace a different one of the legs at one end of the core, which legs may be termed the input legs. Since the cross sectional area of each of these legs is equal to one third of that of the entire core, the amount of flux reversal which can be accomplished by energizing these windings is quantified. As a result, when only one input winding is energized, only the inner one of the legs at the other end of the core is switched; when two input windings are energized, two of the legs at the other end of the core are switched; and the three legs at the other end of the core are switched when all three inputs are actuated. The legs at the other end of the core, which are switched in accordance with the number of inputs applied, may be referred to as the output legs since the output sum and carry windings are wound to embrace them. The carry winding embraces the middle one of the output legs, that is the output leg which is included in the flux path of intermediate length, and produces an output when two or more inputs are applied. The sum winding is wound in figure eight fashion to embrace the inner and outer output legs with turns of the same sense and the middle leg with a winding of opposite sense. The output may be realized when the inputs are applied, in which case the sum output is bipolar, or upon resetting the core to its initial state subsequent to the switching effected by the selective energization of the input windings.

In order to produce a single output pulse indicative of a sum, it is necessary, upon resetting, to cause the inner and middle output legs to be switched simultaneously so that the voltages then induced in the figure eight sum winding cancel. This may be accomplished by employing a reset winding which links the inner or shorter path with a lesser number of turns than the next longer path and the longest path with a still greater number of turns. In this way the flux reversal effected in all legs upon resetting is essentially simultaneous and a single output signal indicative of the prior application of one or three inputs is realized.

Proper cancellation and, therefore, the elimination of bipolar outputs on the figure eight sum winding, may also be achieved, as shown in another embodiment, by connecting the sum winding in a loop in which current flow is inhibited at input time but allowed at reset time. Still a further embodiment shows the coupling of the sum winding to a winding on a toroidal core which is set in accordance with the number of inputs applied. In this embodiment the effects of loop current on the sum winding at input time, which could interfere with the selective switching of the output legs, is overcome by utilizing a bias winding which links these legs and is energized at the time input signals are applied.

Other embodiments of the invention show structures for performing, individually and coincidently, different commutative and non-commutative logical switching functions for two and three input variables. The non-commutative functions are realized by so winding the input windings that the flux changes produced by each are not the same. In one embodiment this is achieved by winding one of the input windings to link one of the output legs. In a second embodiment non-commutative outputs are realized by winding one of the input windings to link two of the input legs and the other to link only one input leg. In this way, different quantification of the inputs is realized and non-commutative outputs are produced on output windings linking one or more of the output legs.

Thus another object of the invention is to provide a single core full adder circuit.

A further object is to provide a plural input magnetic core circuit wherein the inputs are quantified by the cross sectional area of the core material embraced by the windings to which they are applied.

A further object is to provide a magnetic core circuit having a figure eight type output winding linking parallel paths of different reluctance included within the core with turns of opposite sense wherein the paths are simultaneously switched utilizing a drive winding which is effective to apply a greater magnetomotive force to the path having the greater reluctance.

Still another object is to provide a multipath core circuit utilizing a figure eight output winding embracing parallel paths of different reluctance wherein flux reversal in the paths is controlled, both at input time and when the core is reset, by controlling current flow in the figure eight output winding.

Another object is to provide a multilegged core circuit in which outputs are realized using a figure eight type output winding wherein flux reversal in the legs linked by the output windings is controlled by selectively applying bias magnetomotive force to these legs.

Still another object is to provide a multipath magnetic core circuit having a figure eight output winding wherein the circuit output is manifested by the state of a bistable element coupled to the winding.

Another object is to provide plural input logical circuits utilizing multipath magnetic core structures wherein the input windings are arranged to produce recognizably different flux changes in the portion of the core structure linked by the output winding to thereby achieve non-commutative logical outputs.

These and other objects of the invention will be pointed out in the following description and claims and illustrated in the accompanying drawings, which disclose, by way of example, the principle of the invention and the best mode, which has been contemplated, of applying the principle.

Figures 1, 2, 3A, 3B:
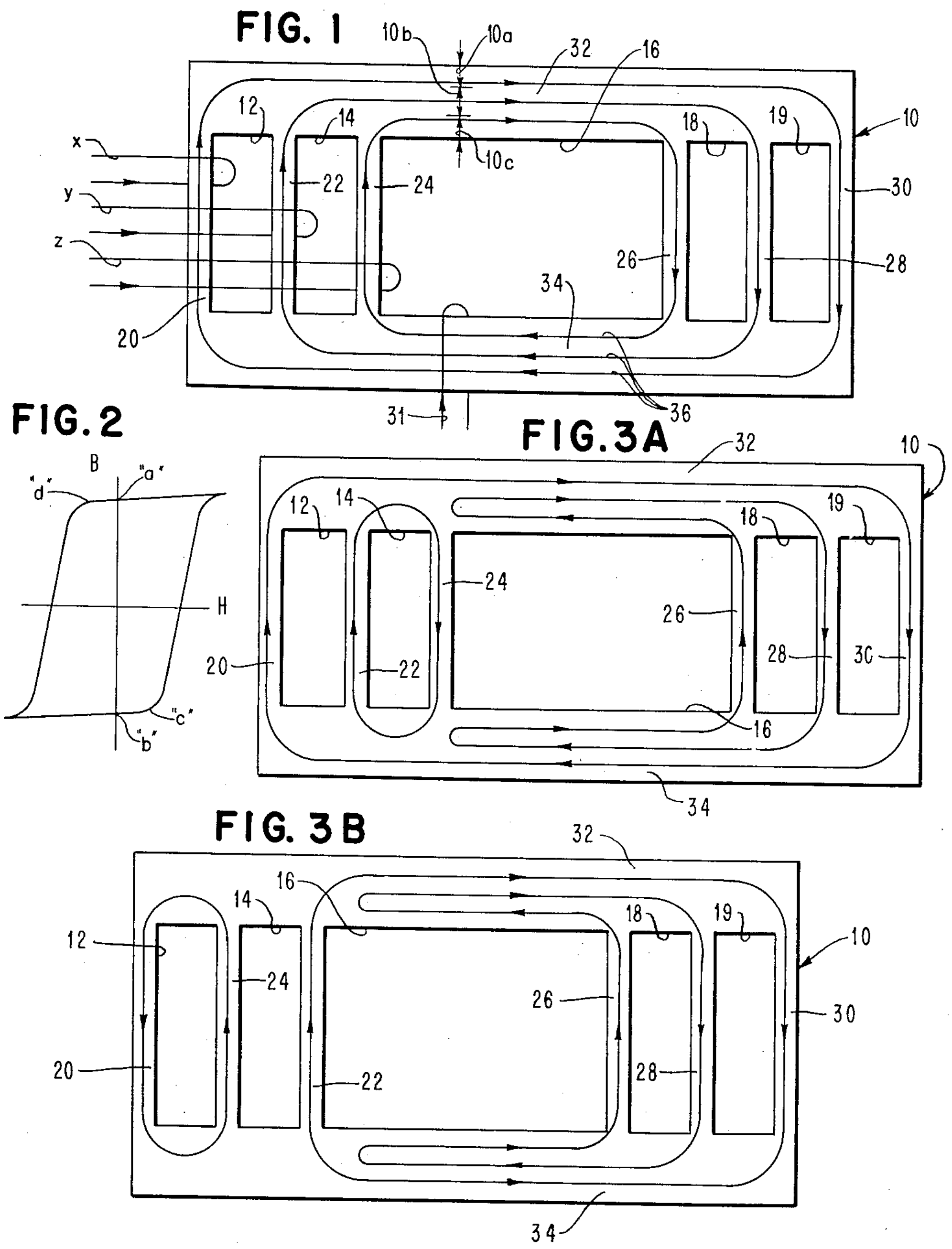
Fig. 1 is a diagrammatic representation of a multilegged magnetic core structure of the type which may be utilized in practicing the invention.
Fig. 2 is a plot of flux density (B) versus magnetic field intensity (H) for a magnetic material such as might be employed in the core structures of the invention.

Figs. 3A, 3B, 3C, and 3D are diagrammatic representations of flux patterns achieved in the core structure of Fig. 1 in response to the application of different inputs and combination of inputs.

Figures 3C, 3D, 4:
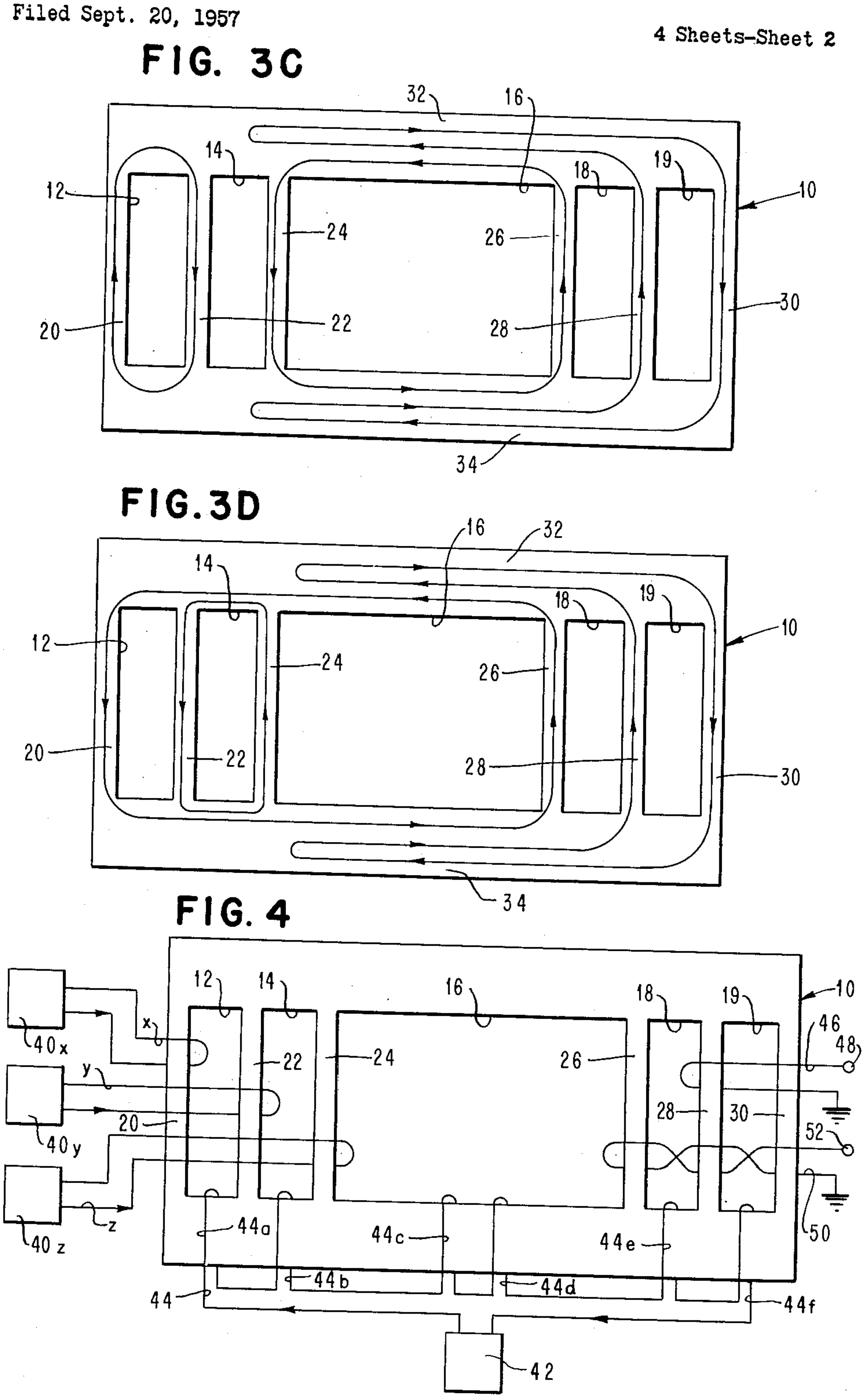

Fig. 4 is a diagrammatic showing of a binary full adder constructed in accordance with the principles of the invention.

Figure 5:
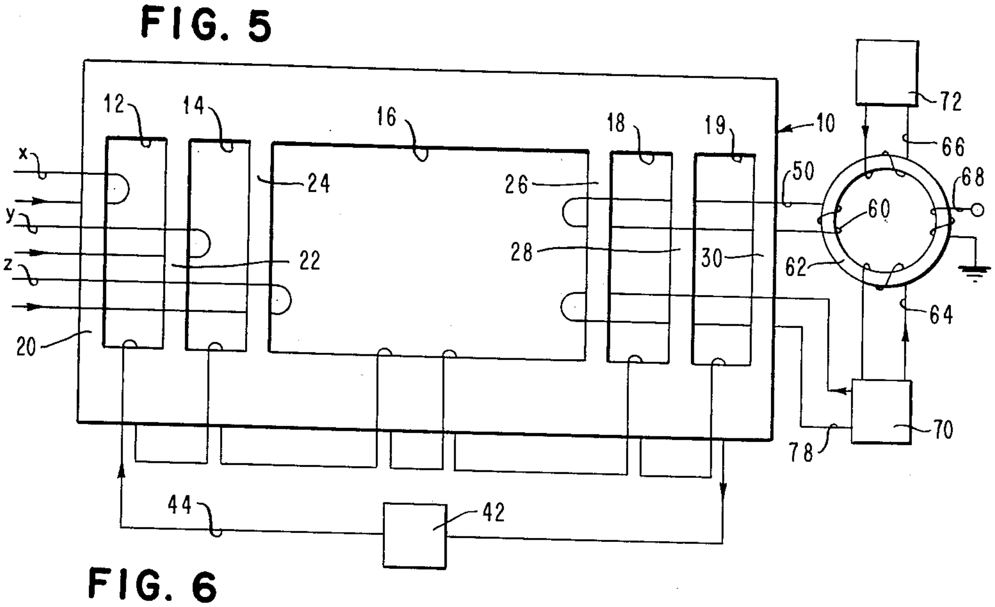
Figure 6:
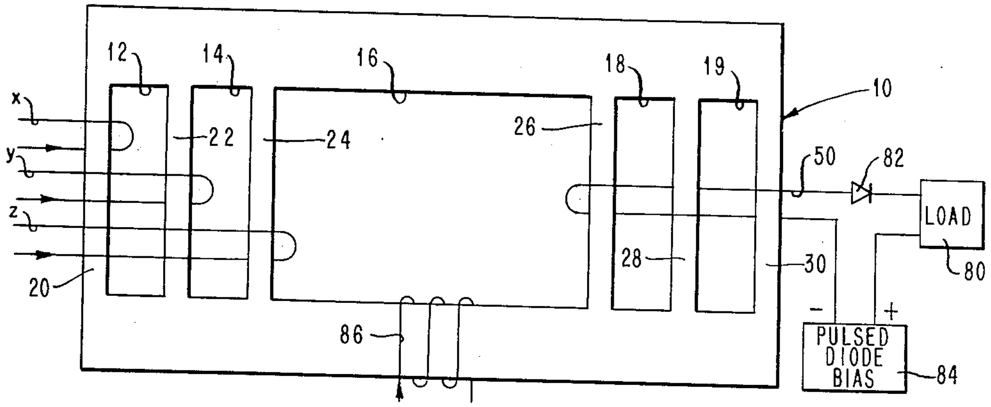

Figs. 5 and 6 show embodiments of different circuitry usable to realize discrete sum output signals from figure eight output type windings such as the sum output winding in the adder of Fig. 4.

Figs. 7, 8, 9, and 10 are schematic representations of embodiments illustrating the manner in which various plural input commutative and non-commutative logical circuits may be constructed in accordance with the principles of the invention.

Referring now to Fig. 1, there is shown a core 10 of magnetic material. The magnetic material utilized is what has come to be known as "square loop" material; that is, a material for which a plot of flux density B versus magnetic field intensity H is in the form of an essentially square hysteresis loop. A plot of this type is shown in Fig. 2 and, as there demonstrated, the material exhibits two limiting states of flux remanence designated *a* and *b* and the "knees" of the loop designated *c* and *d* are relatively sharp indicating that the material has a sharply defined threshold which must be exceeded to initiate flux reversal from one direction to the other. The core 10 has 5 openings 12, 14, 16, 18, and 19 pierced therethrough which openings may be considered to divide the core into three parallel flux paths designated 10*a*, 10*b* and 10*c*. Along the top and bottom sections of the core these paths are not separated but at the right and left ends of the cores the three paths are separated by openings 12, 14, 18 and 19. These openings divide the left section of the core into three parallel legs 20, 22, and 24 and the right section of the core into three parallel legs 26, 28, 30. The cross sectional area of each of these legs is essentially the same and is equal to one third of the cross sectional area of the top and bottom legs or sections of the core which are designated 32 and 34. Because of the three parallel legs at either end of the core, this type structure is referred to as a six legged core.

The core 10 is provided with three input windings *x*, *y*, and *z* which respectively link legs 20, 22 and 24. Observations have been made of the flux changes which occur in the legs 26, 28, and 30 when input pulses of sufficient magnitude to cause flux reversal are applied individually and coincidently to these input windings. Initially the core is reset to a condition of flux remanence in the clockwise direction by energizing a winding 31 so that the flux is oriented as indicated by the arrows on lines 36. In this condition, the flux in the three legs of the left section is oriented in an up direction and the flux in the three legs of the right section is oriented in the down direction. It has been found that when an input pulse of sufficient magnitude and of a polarity to cause current flow in the direction indicated is applied to any one of the windings *x*, *y*, or *z* with the core in this initial condition, the flux orientation is reversed in the leg linked by the pulsed winding and also in the leg 26 of the right section. When any two of these windings are energized, the legs of the left section linked by these windings undergo a flux reversal as do the two right hand legs 26 and 28. When all three windings are energized, flux throughout the entire core is reversed and a remanent condition is established with the flux reversed in all six of the legs. Particular note should be made of the fact that the flux reversal accomplished in the legs of the right section is the same regardless of which one of the windings or which two are energized. When any one of the three input windings is energized alone the flux is reversed to the up direction in leg 26 and remains oriented in the down direction in legs 28 and 30. When any two of the three input windings are energized the flux is reversed to the up direction in legs 26 and 28 and remains oriented in the downward direction in leg 30. The operation is the same even if the input pulses are greatly in excess of that necessary to exceed the coercive force for the material in the paths linked. This is so since the material in the cross sectional areas of the legs 20, 22, and 24 serves to quantify the amount of flux reversal that can be accomplished by applying magnetomotive force to these legs. Therefore, regardless of the amount of magnetomotive force applied to any one of these legs, the amount of flux reversal which can be accomplished in the core is limited.

Figs. 3A, 3B, 3C, and 3D depict what is believed to be a fair representation of the remanent states of flux orientation in the core established by energizing windings *x*, *y*, and *z*, individually and in combination, after the flux in the core has been initially oriented in a clockwise direction as indicated in Fig. 1. In each case the amount of flux reversal that is achieved is quantified by the dimensions of the leg or legs linked by the winding or windings energized and the particular paths in which flux reversal is accomplished in each instance are those requiring the least energy change. Fig. 3A shows the flux distribution resulting from exclusive energization of winding *z* which embraces leg 24. As there shown, energization of winding *z* reverses the flux in leg 24 and causes flux to be oriented in a clockwise direction in a closed path around the opening 14. This causes "kidneying" of the flux initially oriented in paths 10*b* and 10*c* which paths include legs 22 and 28, and 24 and 26, respectively. Since the inner path is shorter, flux reversal is accomplished in this path and thus the flux in leg 26 is reversed. A similar result is achieved when winding *y* is exclusively energized; the only difference being in the resulting direction of flux orientation in the closed path around opening 14 which in this case is counterclockwise with the flux in the leg 22 having been reversed. Fig. 3B shows the flux orientation established when winding *x* is exclusively energized. Here a localized magnetic circuit is completed around opening 12 and, as before, the flux in paths 10*b* and 10*c* is "kidneyed" with flux reversal taking place in the shorter path including leg 26. The flux in path 10*a* which was originally completed through leg 20 is, due to the establishing of the localized shorter closed path around opening 12, diverted and completed through leg 24. In each of the above described cases, that is for exclusive energization of any one of the windings *x*, *y*, or *z*, flux is always reversed only in the leg embraced by the winding energized and in leg 26.

Fig. 3C shows the flux distribution resulting from a coincident energization of windings *y* and *z*. The flux in leg 22 linked by winding *y* is reversed causing a closed path with flux oriented in a clockwise direction to be established around opening 12. The flux in leg 24 and in the entire path 10*c* including leg 26 is reversed and, in order that all flux lines close, the flux in paths 10*a* and 10*b* is "kidneyed" with flux reversal occurring in the shorter path 10*b* which includes leg 28. The distribution is essentially the same when windings *x* and *z* are coincidently energized, the only difference being in the direction of flux orientation around opening 12, which in this case is counterclockwise. In Fig. 3D, the flux pattern existing after a coincident energization of windings *x* and *y* is shown. Here a localized path of flux orientation is established around opening 14 with flux reversal occurring in the leg 22 linked by winding *y*. Since flux reversal must also take place in the leg 20 which is linked by winding *x* and legs 22 and 24 are saturated by the magnetomotive force supplied by winding *y*, a closed path of flux orientation in a counterclockwise direction is completed through legs 20 and 26 with the flux in both legs being reversed. The flux in paths 10*a* and 10*b* is again "kidneyed" with flux reversal being accomplished in the shorter path including leg 28. Thus in each case where two of the windings *x*, *y*, and *z* are coincidently energized, the flux is reversed in legs 26 and 28 and remains oriented in the same direction in leg 30. When all three windings are coincidently energized the flux is reversed throughout the entire core and a remanent condition with flux oriented in a counterclockwise direction is established in each of the paths 10*a*, 10*b*, and 10*c*.

It should be here noted that the flux reversals accomplished are effectively quantified by the cross sectional area of the legs embraced by the windings to which the inputs are applied. For example, it can be seen that the total flux change in the top or bottom sections 32 or 34, or in the three legs 26, 28, 30 considered as a whole, reflects the number of input windings energized. When one input is applied, one-third of the flux in sections 32 and 34 and all of the flux in leg 26 is reversed; when two inputs are applied, two-thirds of the flux in sections 32 and 34 and all of the flux in legs 26 and 28 is reversed; and when three inputs are applied, all of the flux in sections 32 and 34 and in the legs 26, 28, and 30 is reversed. Thus, an analogue output indicative of the number of inputs applied may be realized by providing an output winding which embraces, for example, section 32. The analogue type flux changes effected may be separated and discrete pulse outputs indicative of the number of inputs applied may be realized by providing three separate output windings which respectively embrace legs 26, 28, and 30. It should further be noted that the principles of quantification and digital to analogue and analogue to digital conversion illustrated above with respect to the six legged core structure shown are not restricted to this structure and may be applied in fabricating circuits employing core structures having any desired number of input legs to which inputs may be applied and thereby quantified and any number of output legs about which sense windings may be wound.

Fig. 4 shows the core structure 10 of the previous figures with the windings necessary to constitute a full binary adder circuit. Inputs are applied to the circuit by controllable signal sources 40*x*, 40*y*, and 40*z* which are coupled to windings *x*, *y*, and *z*, respectively, and when actuated cause current flow in the windings in the directions indicated. The core is initially reset to the remanent state with all flux oriented in the clockwise direction by activating a reset signal source 42 which is coupled to a reset winding 44. As described above, when any one of the input windings *x*, *y*, or *z* is energized, flux reversal is accomplished in leg 26 and no flux reversal occurs in legs 28 and 30; when any two of the input windings are energized, legs 26 and 28 undergo a flux reversal and the direction of flux orientation in leg 30 remains unchanged; and when all three inputs are energized, flux is reversed in all three legs 26, 28, and 30. The carry output for the circuit, which to satisfy the logical requirements of a binary full adder must be realized when two or three inputs are applied, is developed in a winding 46 and manifested at a carry output terminal 48. The sum output for the circuit, which to satisfy the logical requirements of a binary full adder must be realized when one or three inputs are applied, is developed on a sum output winding 50 and manifested at a terminal 52. Carry output winding 46 is threaded through openings 18 and 19 to embrace leg 28. Flux reversal is accomplished in this leg, as illustrated in Figs. 3A, 3B, 3C, and 3D, only when two or more of the input windings are coincidently energized. Therefore, carry output winding 46 senses a flux reversal in this leg both at the time the inputs are applied and also when reset winding 48 is subsequently energized to reset the entire core to the clockwise condition of flux remanence illustrated in Fig. 1.

The sum output winding 50 is threaded through openings 16, 18, and 19 to embrace the legs 26, 28, and 30 in what is known as figure eight fashion, that is, the turns of winding 50 embracing legs 26 and 30 are of one sense and the turn embracing leg 28 is wound in an opposite sense. Thus when, for example, flux changes in the same direction occur in all three of these legs, an output of one polarity is induced in the turns of winding 50 which embrace legs 26 and 30 and an output of opposite polarity is induced in the turn of winding 50 which embraces leg 28. When three inputs are applied to the core coincidently, the total magnetomotive force is applied to the three paths 10*a*, 10*b*, and 10*c*, which paths respectively include legs 30, 28, and 26. However, since the paths are of different length the magnetic field intensity H applied to each path is different; the intensity of the field applied to the shorter path 10*c* which includes leg 26 is greater than that applied to the path 10*b* which includes leg 28, and the intensity of the field applied to the latter path is greater than that applied to path 10*a* which includes leg 30. As a result, the flux in these three legs embraced by winding 50 is not reversed simultaneously and, though there is some overlapping, the pulses of opposite polarity do not completely cancel and three successive pulses of alternating polarity may be induced on sum output winding 50 and manifested at terminal 52. The operation is similar when two of the input windings *x*, *y*, and *z* are coincidently energized. In this case, legs 26 and 28 are switched but not exactly during the same time interval and two successive pulses of opposite polarity may be observed at terminal 52. A single output meeting the requirements for a sum output of a full binary adder, that is, one which is realized only when one or three inputs are applied, may be achieved by causing the flux in all of the legs 26, 28, and 30, in which the input pulses have caused a flux reversal, to be simultaneously switched to the original down direction of Fig. 1. This is accomplished by winding the reset winding 44 so that a larger number of turns link the longest path 10*a* than link path 10*b* and a larger number of turns link the latter path than link the shortest path 10*c*. This type of reset winding arrangement is shown on Fig. 4 wherein reset winding 44 includes, by way of illustration, six turns 44*a* through 44$f$ so that the magnetomotive force applied to path 10$c$ is supplied by the two turns 44$c$ and 44$d$; the magnetomotive force applied to path 10$b$ is greater since it is applied by four turns 44$b$, 44$c$, 44$d$, and 44$e$; and the magnetomotive force applied to the longest path 10$a$ is even greater since it is applied by all six of the turns of winding 44. The relative numbers of turns shown is purely illustrative since it varies with the difference in the lengths of the three paths; the requirement being that the magnetomotive forces applied to the three paths is such that each is subjected to a field H of essentially the same intensity. As a result, three legs 26, 28, and 30 are switched essentially during the same time interval when reset winding 44 is energized by actuating signal source 42. When a single input is applied, only leg 26 is switched and, upon subsequent energization of reset winding 44, an output signal is induced on winding 50. When two inputs are applied, legs 26 and 28 are switched and, upon the subsequent energization of reset winding 44 these two legs are reset causing opposite polarity pulses to be induced on the portions of winding 50 which link these legs. These opposite polarity pulses occur essentially simultaneously and, therefore, cancel each other and no significant output is manifested at sum output terminal 52. When three inputs are applied, the pulses developed as legs 26 and 28 are reset again cancel, but the resetting of leg 30 is sensed by the portion of winding 50 linking that leg and an output signal is manifested at terminal 52.

Another method of avoiding the production of successive bipolar output pulses is illustrated in the embodiment of Fig. 5. Since there is no problem in deriving the carry outputs on winding 46, only the figure eight sum output winding 50 is here shown. This winding 50 is serially connected to a winding 60 which embraces a toroidal core 62. Core 62 is also provided with a write bias winding 64, a read bias winding 66 and an output winding 68. The normal state of core 62 may be represented at "$a$" on the hysteresis loop of Fig. 2. During input time, that is the time at which inputs are selectively applied to windings $x$, $y$, and $z$, a signal source 70, to which write bias winding 64 is coupled, is actuated. The magnetomotive force then supplied by winding 64 biases core 62 toward the threshold "$d$" of Fig. 1. When one or three of the input windings $x$, $y$, and $z$ are energized and, therefore, a sum output is called for, the core 62 is switched from the remanent state "$a$" to the remanent state "$b$." The read bias winding 66 is coupled to a signal source 72 which is activated in conjunction with read signal source 42 to energize winding 66 so that core 60 is biased toward the threshold "$c$" of Fig. 2 at read out time. A further winding 78 is energized by signal source 70. This winding links legs 28 and 30 of core 62 with turns of one sense and leg 26 with a turn of opposite sense and is energized at input or write time in each cycle.

The structure of Fig. 5 is effective to produce almost complete cancellation of bipolar outputs when, at reset time, the flux in both of the legs 26 and 28 is reversed. This is due to the fact that the winding 50 is now coupled in a closed loop the impedance of which is determined by the switching impedance of core 60. Thus, for example, if a reset pulse is applied to winding 44 with legs 26 and 28 having their flux oriented in the up direction, the shorter path 10$c$ including leg 26 initially tends to switch first. However, this switching causes current flow in the loop including windings 50 and 60 in a direction to oppose the flux change in leg 26. Since the turn of winding 50 embracing leg 28 is opposite in sense to that embracing leg 26, this current flow is in a direction to aid switching in leg 28. The flux in leg 28 is switched by the magnetomotive forces supplied by current flow in both winding 44 and in the loop circuit thereby inducing an output voltage on the winding 50 opposite to that produced by the flux change in leg 26.

These output voltages cancel and any tendency of leg 26 to switch first is balanced by current flow in the loop circuit so that legs 26 and 28 are switched coincidently and no output is produced. When three inputs have been applied, the outputs due to resetting legs 26 and 28 again cancel but the resetting of leg 30 is sufficient to energize winding 60 and switch core 62 back to the $a$ state thereby providing a single sum output signal on output winding 68. When only one input has been applied the resetting of leg 26 alone is likewise effective to cause energization of winding 60, setting of core 62 and the development of an output on winding 68.

The current flow through the loop including windings 50 and 60 which causes legs 26 and 28 to switch simultaneously is advantageous at read time but could have deleterious effects during write time since at this time it is necessary that the difference in reluctances of the paths 10$b$ and 10$c$ be preserved so that all of the switching accomplished when only one input is applied will occur in leg 26. It is for this reason that the winding 78, which is energized by source 70 at input or write time, is provided. This winding applies magnetomotive force in the upward direction to leg 26 and in the downward direction in legs 28 and 30; thereby, in effect, increasing the reluctance of legs 28 and 30 to switching and decreasing the reluctance of leg 26 to switching. When one input is applied, flux reversal in leg 26 is initiated, thereby causing current flow in winding 50 in a direction to render this winding effective to apply magnetomotive force in a direction to aid switching in leg 28. This magnetomotive force is opposed by that applied by winding 78. In this way the effect of the loop current in winding 60 is, during write time, obviated and only leg 26 is switched when one input is applied, only paths 26 and 28 are successively switched when two inputs are applied and paths 26, 28, and 30 are switched when all three of the input windings $x$, $y$, and $z$ are coincidently energized.

In the case when two inputs are applied, the first output leg 26 is switched first and, during this switching, only a small amount of switching is accomplished in leg 28. After leg 26 is switched the problem seems to exist as to the possibility of flux reversal splitting between legs 28 and 30 due to the loop current in winding 50 which, in effect, decreases the reluctance of the leg 30 to switching. The biasing magnetomotive force applied to these legs by winding 78 is, in the embodiment shown, the same. However, it has been found that when two inputs are applied to the circuit including the toroid 62 and the winding connections shown, flux reversal occurs only in legs 26 and 28. This may be due to a difference in the impedance presented by the circuit to the voltage generated in one direction initially on the turn of winding 50 embracing leg 26 and subsequently in the opposite direction generated by the turn of winding 50 embracing leg 28. It has been ascertained that when the legs are successively switched leg 26 is switched faster than leg 28 thereby inducing a larger voltage in winding 50. This possible increase in impedance and the lower magnitude of voltage induced when leg 28 is switched both tend to diminish the loop current. This diminished loop current does not sufficiently decrease the reluctance of leg 30 to switching in the presence of the opposing bias supplied by winding 78 to allow the flux reversal to be split between legs 28 and 30 and, therefore, when two inputs are applied all of the flux reversal accomplished occurs in paths 26 and 28. In order to ensure that this condition of operation is maintained, the compensating bias winding 78 may be arranged to embrace leg 30 with a greater number of turns than it embraces leg 28 or, if desired, three separate compensating bias windings may be provided each embracing only one of the legs and each connected to a separate signal source. With this latter arrangement the biases applied at input time may be adjusted carefully to ensure that flux reversal is accomplished in the proper output legs for each combination of inputs.

It should be apparent from the above that, with the structure of Fig. 5 employed to develop the sum output, the outputs for the full adder are also realized when the input signals are initially applied. The state of core 60 indicates the logical sum of the inputs applied. This indication is realized when the inputs are applied and is stored and may be reproduced when the circuit is reset. The carry output winding 46, shown in Fig. 4, of course, produces carry outputs both when inputs are applied and subsequently when the circuit is reset.

It should be noted that bipolar outputs in the figure eight sum output winding may be avoided by providing a closed output loop through which current may flow during reset time as is done in Fig. 5. However, to ensure that only the proper output legs 26, 28, and 30 are switched for different combinations of inputs and there is no deleterious splitting of flux between these legs, an arrangement may be employed utilizing a compensating winding such as 78 shown in Fig. 5 which is energized only at input time or the output circuit may be arranged such that, as in Fig. 4, the figure eight output winding is, at input time, either open circuited or connected to a high impedance load. An arrangement of the latter type is shown in the embodiment of Fig. 6. Here the sum output winding 50 is coupled to a load device 80 through a diode 82, and a signal source 84 is provided for biasing the diode 82 during input time. The diode 82 presents a high impedance to current flow in a counter-clockwise direction in the loop circuit including winding 50 and load 80 during both input and output time. Signal source 84 is actuated only at input time to bias the diode 82 in the polarity indicated so that at this time current flow through the loop in either direction is inhibited. Winding 50 is thus presented with a high impedance at input time so that flux quantification in core 10 is accomplished in the proper manner with all of the flux reversal effected when one input is applied taking place in leg 26 and all of the flux reversal effected when two inputs are applied taking place in legs 28 and 30. At output or reset time when the core 10 is reset by a pulse supplied to a reset winding 86, signal source 84 is not actuated thus allowing loop current to flow in winding 50 as the result of flux reversal in leg 26 or 30. This loop current is effective when two or more of the legs have been previously switched to ensure that legs 26 and 28 are reset simultaneously and that their induced output voltages cancel so that only a single discrete pulse output is obtained when one or three inputs have been applied. It should be noted that the reset winding 86, shown in Fig. 6, embraces each of the paths with the same number of turns whereas in the structures of Figs. 4 and 5 the reset winding is shown to link the successively longer paths with successively greater numbers of turns. This type of winding arrangement, of itself, aids in the elimination of bipolar outputs as does the output circuit arrangements of Figs. 5 and 6 and these arrangements may be used singly or in combination in accordance with the stringency of output circuit requirements.

Various other commutative and non-commutative logical functions may be performed utilizing circuitry constructed and operated in accordance with the principles of the invention. The sum and carry logical outputs of a full adder are, of course, commutative logical outputs in that the same outputs are realized for a given number of inputs regardless of which of the inputs comprise that number. Non-commutative logic is that by which the outputs, which are realized in response to the application of different combinations of inputs, are dependent not only on the number of inputs which are applied but also upon the particular inputs which are applied; that is, one or more of the inputs may have a special significance in determining the output. A discussion of commutative and non-commutative functions is included in the copending application Serial No. 611,922, filed on September 25, 1956, in behalf of B. Dunham and assigned to the assignee of this application. For example, in this copending application circuitry is shown for realizing the sixteen possible logical commutative and non-commutative operators which can be realized from two input variables.

Figure 7:
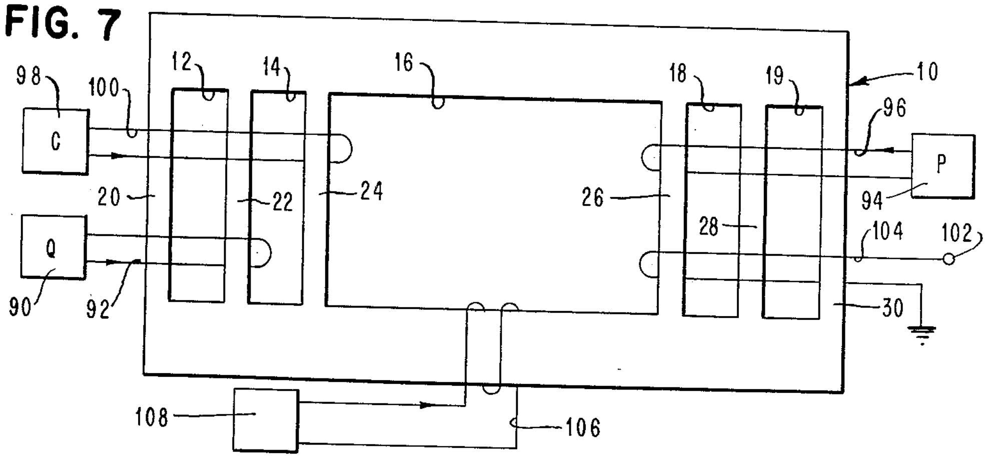

Fig. 7 shows a circuit for realizing one of the non-commutative functions for two input variables P and Q; the function realized is the "If P, Then Q" function which demands that outputs be produced when any of the following conditions obtain:

$$PQ+\bar{P}Q+\bar{P}\bar{Q}$$

An output is realized for the above logical operator when both of the inputs are present (PQ); when only the input Q is present ($\bar{P}Q$); and when neither of the inputs is present ($\bar{P}\bar{Q}$). In the circuit of Fig. 7 the six-legged core 10 is again utilized with the Q input being supplied by a signal source 90 coupled to a winding 92 which embraces leg 22 and the P input applied by a signal source 94 which is connected to a winding 96 which embraces leg 26. A third non-variable input to the circuit is supplied by a clock pulse source 98 coupled to a winding 100 which embraces leg 24. Clock pulse source 98 supplies a signal causing current to flow in the direction indicated at input time in each cycle. Outputs for the circuit are manifested at a terminal 102 coupled to an output winding 104 which embraces legs 26 and 30 with turns of the same sense but does not embrace leg 28.

The core 10 is initially reset to a condition of flux remanence in the clockwise direction (see Fig. 1) when a reset winding 106 is energized by a reset signal source 108. When neither of the input signal sources 90 or 94 is energized during input time and only clock winding 100 is energized, this clock input, quantified since winding 100 embraces only leg 24, causes flux reversal in legs 24 and 26. Since the latter leg is embraced by output winding 104, an output is realized as is proper when neither of the inputs P or Q ($\bar{P}\bar{Q}$) is present. When during input time source 90 is actuated, quantified inputs are applied by windings 92 and 100 and thus flux reversal is accomplished in legs 22, 24, 26, and 28. The turn of output winding 104 which embraces leg 26 senses the flux reversal in leg 26 and, therefore, an output is realized for an input of Q and not P, ($\bar{P}Q$). When signal source 94 is energized, the pulse supplied to winding 96 is of a polarity to apply magnetomotive force in the down direction to leg 26 and, therefore, inhibits flux reversal in this leg. With flux reversal on the shorter path thus inhibited, the quantified inputs applied by energizing windings 92 and 100 cause flux reversal in the remaining legs 28 and 30. The turn of winding 102 embracing leg 30 senses the flux reversal in this leg and, therefore, an output is realized when both of the inputs P and Q (PQ) are applied at input time. The remaining possible combination of inputs is the $P\bar{Q}$ input which exists when the P signal source 94 is actuated and the Q signal source 90 is not actuated. In this case windings 96 and 100 are energized and, since the energization of winding 96 inhibits flux reversal in the shorter path including leg 26, the only legs reversed are leg 24, which is embraced by clock winding 100, and leg 28. Since output winding 96 does not link leg 28, no output is produced which, of course, satisfies the "If P, Then Q" logical function.

Figures 8, 9:
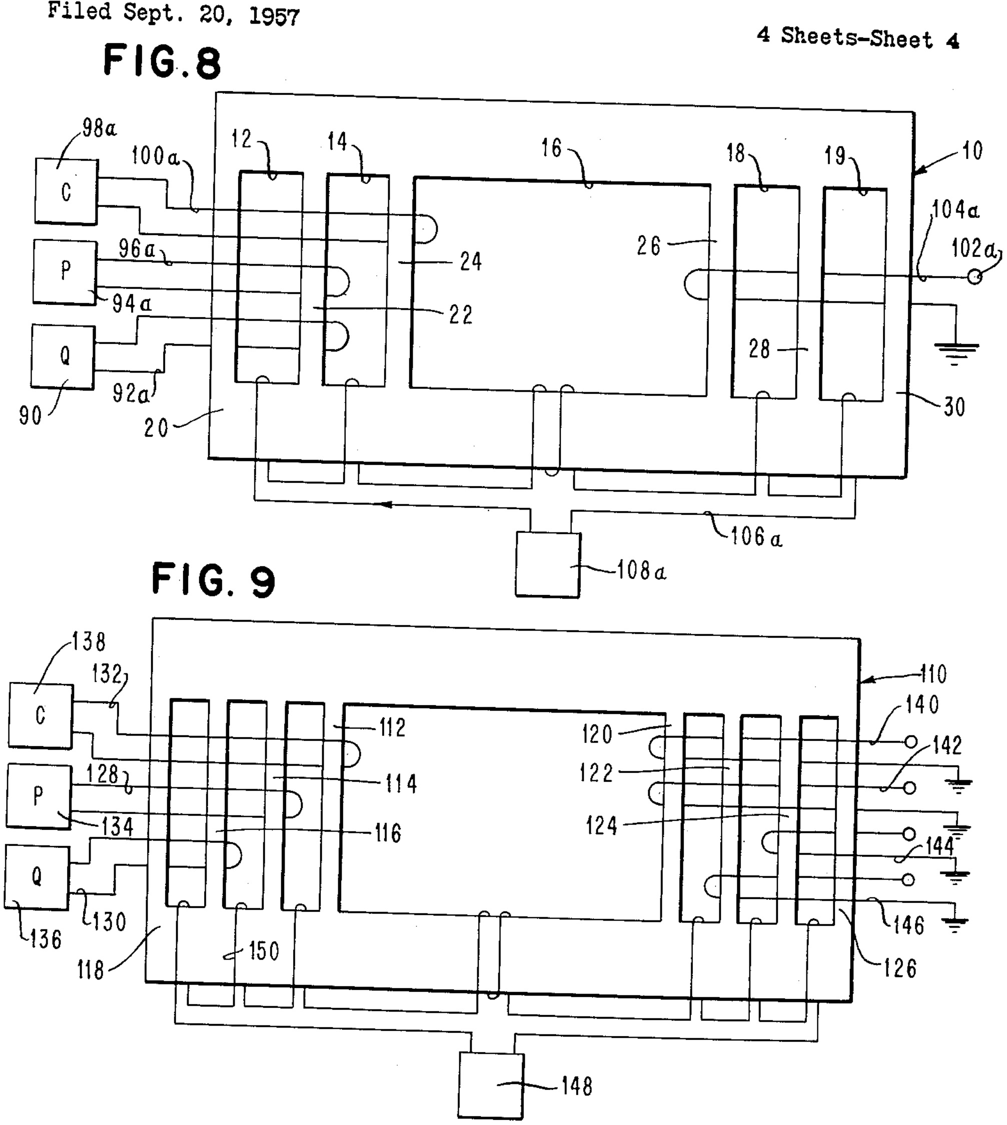

The same logical operator may be realized employing the core 10 with the input windings arranged in the manner shown in Fig. 8. In this figure the various signal sources—clock, input and output windings—are identified using the same designations as used for corresponding structure in Fig. 7 with an *a* affixed. The clock input winding 100*a* here again embraces only leg 24; the P input winding 96*a* in the structure of Fig. 8 embraces only leg 22; and the Q input winding 92*a* embraces both leg 20 and leg 22. In accordance with the quantification principles heretofore explained, winding 92*a*, when energized, is effective, since it embraces the cross sectional area of two legs, to produce twice the flux reversal that each of the windings 100*a* and 96*a* is effective to produce when energized. Thus, when only clock winding 100*a* is energized ($\bar{P}\bar{Q}$), only one of the output legs, leg 26, is switched; when an input Q is applied ($\bar{P}Q$), all three output legs 26, 28, and 30 are switched; when both of the inputs P and Q are applied (PQ), all three of the output legs 26, 28, and 30 are also switched; and when only the P input is energized ($P\bar{Q}$), only two output legs 26 and 28 are switched. The output winding 104*a* is wound in figure eight fashion in the same manner as the sum output winding 50 in Figs. 4, 5, and 6, so that outputs are produced in all but the last described input condition ($P\bar{Q}$) and the logic for the "If P, Then Q" function is thus satisfied. In order to avoid bipolar outputs, the output signal may be produced using a reset winding 106*a* which is of the type shown and described with reference to Fig. 4. The output circuits shown in Figs. 5 and 6 might also be utilized to derive the output induced in the figure eight winding in this or any of the embodiments later to be described.

In Fig. 9 there is shown an eight legged core structure 110 having four legs 112, 114, 116, and 118 to which inputs are applied, and four output legs 120, 122, 124, and 126 in which flux changes are sensed. Two input windings 128 and 130 and a clock pulse winding 132 are provided and these windings are respectively coupled to a P input signal source 134, a Q input signal source 136 and a clock input signal source 138. Clock winding 132 embraces leg 112; the P input winding 128 embraces leg 114; and the Q input winding embraces legs 116 and 118. Again quantification is accomplished by the cross section areas of the portions of the core embraced by these input and clock windings; the cross sectional area of each of the legs here being essentially equal to one quarter of the cross sectional area of the top and bottom horizontals sections of the core. The core structure may be considered to include four parallel paths of successively greater lengths including respectively legs 112 and 120, legs 114 and 122, legs 116 and 124, and 118 and 126. The number of output legs which are switched for any combination of inputs is dependent upon the total cross sectional area of the separate legs embraced by the input windings which are energized. The clock pulse source 138 is energized at input time each cycle and, in the absence of P and Q, inputs causes a flux reversal in only the inner one of the output legs 120. Energization of clock winding 132 and P input winding 128 produces flux reversal in output legs 120 and 122; energization of clock winding 132 and Q input winding 130 produces flux reversal in output legs 120, 122, and 124; and energization of both input windings and the clock pulse winding produces flux reversal in all four output legs.

The core 110 is provided with four output windings 140, 142, 144, 146 each of which produces outputs indicative of a different non-commutative operator for the two input variables P and Q. Winding 140 embraces legs 120 and 124 with turns of one sense and leg 122 with a turn of opposite sense and is the "If P, Then Q" output winding producing outputs for any of the following input combinations:

$$PQ+\bar{P}Q+\bar{P}\bar{Q}$$

Winding 142 embraces legs 120 and 126 with turns of one sense and leg 124 with a turn of opposite sense and is the "If Q, Then P" output winding producing outputs under any of the following input conditions:

$$PQ+P\bar{Q}+\bar{P}\bar{Q}$$

Winding 144 embraces legs 124 and 126 with turns of opposite sense and produces the "Q But Not P" function which requires an output only when the input P is not present and the input Q is present ($\bar{P}Q$). Winding 146 embraces legs 122 and 124 with turns of opposite sense and is the "P But Not Q" winding providing outputs only when the input P is present and the input Q is not present ($P\bar{Q}$). The outputs are here produced under the control of signal source 148 coupled to a reset winding 150 of the type shown in Fig. 4, though, of course, output circuit arrangements such as are shown in Figs. 5 and 6 might also be employed.

It should be apparent from the above that, by properly arranging the necessary output windings, all 16 of the commutative and non-commutative logical functions for the two input variables P and Q may be realized utilizing the single core 110, the distinction between P and Q inputs necessary to realize non-commutative functions being accomplished by arranging the respective P and Q inputs to embrace different magnitudes of cross sectional area of the core whereby the inputs applied to these windings are quantified differently.

Figure 10:
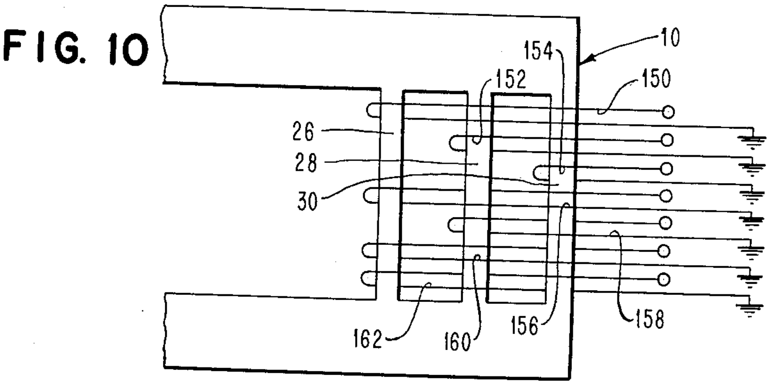

Fig. 10 is a further embodiment illustrating the manner in which the inventive concept may be applied to provide universal logical circuitry for performing all of the logical functions for any number of inputs. In this embodiment, the core structure 10 of Figs. 1 through 6 is employed and only the right hand or output section of this structure is shown in Fig. 10. The three variable inputs are applied, as in the above mentioned embodiments, by *x*, *y*, and *z* windings each of which links one of the input legs. There are seven output windings shown which produce outputs for seven different commutative logical functions of the three variable inputs. Output winding 150 embraces only leg 26 and performs the Inclusive OR function producing an output when any one or more of the imputs are energized. Winding 152 embraces only leg 28 and produces an output when any two or more of the input windings are energized. Winding 154 embraces leg 30 only and performs the three input AND logical function producing an output only when all three input windings are energized. Winding 156 embraces legs 26 and 28 with turns of opposite sense and produces an output when "one and only one" of the input windings is energized. Winding 158 embraces legs 28 and 30 with turns of opposite sense and produces an output when "two and only two" of the input windings are energized. Winding 160 embraces legs 26 and 30 and produces an output when one or two of the input windings are energized and winding 162 is wound in the same manner as the sum output winding of the previous embodiments and produces an output when one or three inputs are applied. Outputs may be taken utilizing the output arrangements shown in any one of the previous embodiments.

It should be apparent from the above description of the preferred embodiments of the invention that the inventive principles can be applied to provide circuits capable of generating any number of logical outputs from any number of variable inputs. The structures shown may be extended to include any number of legs as the number of inputs is increased, and the proper quantification or weighting of the inputs may be achieved by arranging the various input windings to embrace predetermined cross sectional areas of the magnetic core material.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic core binary full adder circuit comprising a core of magnetic material capable of assuming first and second stable states of flux remanence and having first, second and third flux paths; first, second and third selectively energizable input winding means associated with said core, a carry output winding means linking said second flux path for developing an output indicative of energization of two or three of said input winding means, a sum output winding means linking each of said first and third flux paths with winding means of a first sense and said second flux path with winding means of a sense opposite to said first sense for developing an output indicative of energization of one or three of said input winding means.

2. A magnetic core binary full adder circuit comprising a core of magnetic material capable of assuming first and second stable states of flux remanence and having first, second and third flux paths, a carry output winding means embracing at least a portion of said second flux path, a sum output winding means embracing at least a portion of said first flux path and at least a portion of said third flux path with winding means of a first sense and at least a portion of said second flux path with winding means of a sense opposite said first sense, and first, second and third input winding means associated with said core, any one of said input winding means being effective when energized to cause flux reversal in said first flux path, any two of said input winding means being effective when energized to cause flux reversal in said first and second flux paths, said three input winding means being effective when energized to cause flux reversal in said first, second and third flux paths.

3. A magnetic core binary full adder circuit comprising a core of magnetic material capable of assuming first and second stable states of undirectional flux remanence in first and second directions and normally in said first state, said core being divided by openings therethrough into first, second and third parallel flux paths, the reluctance of said first flux path to switching from said first state to said second state being less than that of said second flux path and the reluctance of said second flux path to switching from said first to said second state being less than that of said third flux path, first, second and third input means to said binary full adder circuit each associated with said core and each effective when energized to produce only a quantified amount of flux reversal in said core, a carry output winding means threaded through at least one of said openings to embrace at least a portion of said second flux path, and a sum output winding means threaded through at least two of said openings to embrace at least a portion of said first flux path and at least a portion of said third flux path with winding means of a first sense and to embrace at least a portion of said second flux path with a winding means of a sense opposite said first sense.

4. The invention as claimed in claim 3 wherein said first input means comprises winding means embracing said first flux path only, said second input means comprises winding means embracing said second flux path only, and said third input means comprises winding means embracing said third flux path only.

5. A magnetic core logical circuit comprising a core of magnetic material capable of assuming first and second stable states of flux remanence; said core having first and second openings dividing a first portion thereof into first, second and third parallel legs and third and fourth openings dividing a second portion thereof into fourth, fifth, and sixth parallel legs; input means to said circuit comprising first, second and third winding means respectively linking said first, second and third legs; output means for said circuit comprising a fourth winding means including winding means linking said fourth and sixth legs in a first sense and said fifth leg in a sense opposite said first sense.

6. A magnetic core logical circuit comprising a core of magnetic material capable of assuming first and second stable states of flux remanence; said core having first and second openings dividing a first portion thereof into first, second and third parallel legs and third and fourth openings dividing a second portion thereof into fourth, fifth, and sixth parallel legs; input means for said circuit comprising first, second and third winding means each individually linking at least one of said six legs, and output winding means comprising winding means linking at least one of said six legs in a first sense and at least one other of said six legs in a sense opposite said first sense.

7. A magnetic core logical circuit comprising a core of magnetic material capable of assuming first and second stable states of flux remanence; said core having first and second openings dividing a first portion thereof into first, second and third parallel legs and third and fourth openings dividing a second portion thereof into fourth, fifth, and sixth parallel legs; first and second input winding means for said circuit each linking at least one of said six legs not linked by the other of said input winding means, and output winding means linking at least one of said six legs.

8. The invention as claimed in claim 7 wherein said first input winding means links a greater number of said legs than said second input winding means.

9. The invention as claimed in claim 8 wherein said output winding means links at least one of said legs in a first sense and another one of said legs in a sense opposite said first sense.

10. In a magnetic circuit, a core of magnetic material capable of assuming first and second stable states of flux remanence and having at least two parallel flux paths of unequal reluctance, output winding means linking one of said paths in a first sense and the other of said paths in a sense opposite said first sense, and means for causing essentially simultaneous flux reversal in said two parallel flux paths comprising winding means effective when energized to apply more magnetomotive force to one of said paths than to the other of said paths.

11. The invention as claimed in claim 10 wherein said means for causing essentially simultaneous flux reversal in said two parallel paths comprises winding means linking said one of said paths with a greater number of turns than it links the other of said paths.

12. In a magnetic circuit, a core of magnetic material having a portion including first and second parallel flux paths of unequal reluctance, each of said paths being capable of assuming first and second stable states of flux remanence and normally in said first state, first and second input winding means associated with said core, said input winding means being selectively energizable during a first time interval and each being effective when energized to produce in said portion a quantified amount of flux reversal in a direction from said first remanent state to said second remanent state, reset winding means associated with said core effective when energized during a second time interval to apply sufficient magnetomotive force in a direction to reset said paths from said second to said first remanent state, output winding means linking one of said paths with a turn of one sense and the other of said paths with a turn of opposite sense, and circuit means associated with said output winding means and including means operable during one of said first and second time intervals for controlling switching of said paths between said remanent states during said first and second time intervals.

13. The invention as claimed in claim 12 wherein said circuit means includes further winding means linking said first and second paths with turns of opposite sense and means for energizing said further winding means during said second time interval to render said further winding means effective to apply to one of said paths magnetomotive force in a direction to switch that path from said first to said second remanent state and to apply to the other of said paths magnetomotive force in a direction to switch that path from said second to said first remanent state.

14. The invention as claimed in claim 12 wherein said circuit means comprises means coupled to said output winding means for controlling current flow in said winding means during said first and second time intervals.

15. The invention as claimed in claim 14 wherein said means coupled to said output winding means includes means operable to present a first value of impedance to voltages induced on said output winding means during said first time interval and a different value of impedance to voltages induced on said output winding means during said second time interval.

16. The invention as claimed in claim 15 wherein said circuit means includes asymmetric impedance means and means operable during said first time interval to bias said asymmetric impedance means to thereby essentially prevent current flow in either direction in said output winding means during said first time interval.

17. The invention as claimed in claim 12 wherein said circuit means comprise a second magnetic core and further winding means embracing said second core and coupled to said output winding means.

18. The invention as claimed in claim 12 wherein said reset winding means comprise winding means effective when energized to apply to one of said paths a first magnitude of magnetomotive force and to the other said paths a magnitude of magnetomotive force greater than said first magnitude.

19. In a magnetic core circuit, a core of magnetic material having a plurality of flux paths each capable of assuming first and second stable states of flux remanence and of being switched from either of said states to the other of said states, input means to said circuit comprising means effective to selectively apply different quantified magnetizing inputs to said paths to thereby switch one or more of said paths in accordance with the magnetizing input applied, output winding means linking at least one of said paths with a turn of one sense and at least another of said paths with a turn of a sense opposite said first sense, and a second core of magnetic material capable of assuming at least first and second stable states of flux remanence coupled to said output winding means and responsive to output signals induced therein to assume one of said states indicative of the magnetizing input applied by said input means.

20. In a magnetic core circuit, a core of magnetic material having a plurality of flux paths each capable of assuming first and second stable states of flux remanence and of being switched from either of said states to the other of said states, input means to said circuit comprising means effective during a first time interval to selectively apply different quantified magnetizing inputs to said paths to thereby switch one or more of said paths in accordance with the magnetizing input applied, means effective during a second time interval to apply to said paths sufficient magnetomotive forces to switch said paths to their state previous to the application of said inputs, output winding means linking at least one of said paths with a turn of one sense and another of said paths with a turn of opposite sense, and means associated with said output winding means for controlling current flow therethrough when said paths are switched during said first and second time intervals.

21. In a magnetic core circuit comprising a core of magnetic material having a portion including first, second and third flux paths of unequal reluctance, each of said paths being capable of assuming first and second stable states of flux remanence and of being switched from either one of said states to the other one of said states; first, second and third input means to said circuit each effective when actuated to produce in said portion of said core including said paths a corresponding predetermined amount of flux reversal, and output winding means linking said first and third paths with winding means of a first sense and said second path with winding means of a sense opposite said first sense.

22. The invention as claimed in claim 21 wherein said first, second and third input means are each effective when actuated to produce in said portion of said core including said paths the same amount of flux reversal.

23. The invention as claimed in claim 22 wherein said core includes a further portion divided into three parallel legs and said first, second and third input means comprise first, second and third windings each embracing one of said legs.

24. The invention as claimed in claim 21 wherein the predetermined amount of flux reversal produced in said portion including said paths when said first input means is actuated is greater than the predetermined amount of flux reversal produced in said portion when said second input winding means is energized actuated.

25. The invention as claimed in claim 24 wherein said core includes a further portion divided into a plurality of parallel legs and said first input means comprises winding means embracing two of said three legs and said second input means comprises winding means embracing one only of said three legs.

26. A logical circuit element comprising a core of magnetic material capable of assuming first and second stable states of flux remanence and having a first and a second portion each including three parallel legs, said core comprising three parallel flux paths of unequal reluctance with each path including one of said legs in each of said portions, input means to said circuit comprising a plurality of input winding means each embracing at least one of said legs of said first portion, and output means for said circuit including a plurality of output winding means each embracing at least one of said legs of said second portion, at least one of said output windings embracing a first and a second one of said legs of said second portion with a turn of a first sense and the third one of said legs of said second portion with a turn of a sense opposite said first sense.

27. The invention as claimed in claim 26 wherein at least one of said plurality of input winding means embraces a greater part of the magnetic material in said first portion of said core than is embraced by a second one of said plurality of input winding means.

28. A logical circuit element comprising a core of magnetic material capable of assuming first and second stable states of flux remanence and having a first and second portion each including three parallel legs, said core comprising three parallel flux paths of unequal reluctance with each path including one of said legs in each of said portions, first input means to said circuit comprising a plurality of input winding means each embracing at least one of said legs of said first portion, second input winding means to said circuit comprising further input winding means embracing at least one of said legs of said second portion, and output means for said circuit comprising winding means embracing at least one of said legs of said second portion.

29. The invention as claimed in claim 28 wherein said further input winding means and said output winding means each embrace the same one of said legs of said second portion.

30. A logical circuit element comprising a core of magnetic material capable of assuming first and second stable states of flux remanence and having first and second portions each including at least two parallel legs, said core comprising at least two parallel flux paths each including one of said legs in each of said portions, first input means to said circuit comprising first and second individual winding means each embracing a different one of said legs of said first portion, second input means to said circuit comprising third winding means embracing one of said legs of said second portion, and output means for said circuit comprising output winding means embracing at least one of said legs of said second portion.

31. A logical circuit element comprising a core of magnetic material capable of assuming first and second stable states of flux remanence and having first and second portions each including at least two parallel legs, said core comprising at least two parallel flux paths each including one of said legs in each of said portions, first input means to said circuit comprising first and second individual winding means each embracing a different one of said legs of said first portion, second input means to said circuit comprising third winding means embracing one of said legs of said second porton, first means coupled to said first winding means for energizing said winding means during an input time interval, second and third means respectively coupled to said second and third winding means for energizing said second and third winding means during said input time interval coincidently with the energization of said first winding means, and output means for said circuit comprising winding means embracing at least one of said legs of said second portion.

32. A circuit for producing outputs in accordance with a number of different logical combinations of three or more inputs comprising, a core of magnetic material capable of assuming first and second stable states of flux remanence and including a first and a second section; said core including a plurality of openings dividing said second section into first, second, and third parallel legs; first, second, and third input winding means each embracing at least a portion of said first section of said core and each effective when energized to produce a predetermined quantified flux change in said second portion of said core; means for applying first, second and third inputs to said circuit by energizing said first, second and third winding means and thereby producing flux changes in said second section of said core in accordance with the inputs applied; and a plurality of output winding means each linking one or more of said first, second, and third legs and each effective to produce outputs indicative of a different logical combination of said inputs.

References Cited in the file of this patent

UNITED STATES PATENTS

| | | |
|---|---|---|
| 2,519,426 | Grant | Aug. 22, 1950 |
| 2,696,347 | Lo | Dec. 7, 1954 |
| 2,733,424 | Chen | Jan. 31, 1956 |

FOREIGN PATENTS

| | | |
|---|---|---|
| 707,221 | Germany | May 15, 1941 |
| 350,095 | Great Britain | June 11, 1931 |